(12) United States Patent
Khalid et al.

(10) Patent No.: US 9,198,024 B1
(45) Date of Patent: Nov. 24, 2015

(54) REMOTE DEVICE ACTIVATION

(71) Applicant: Verizon Patent and Licensing Inc., Arlington, VA (US)

(72) Inventors: Mohammad Raheel Khalid, Budd Lake, NJ (US); Samir S. Vaidya, Highland Park, NJ (US); Marlene Kay Tan Enright, Bedminster, NJ (US); Shiva Narayanabhatla, Basking Ridge, NJ (US); David B. Murray, Fanwood, NJ (US); Rosemary McNally, Morris Plains, NJ (US); Stephen R. Szabo, Bernardsville, NJ (US); Jeffrey Dietel, Clifton, NJ (US); Erica Ann Martinez, Mountainside, NJ (US); Ji Hoon Kim, Lyndhurst, NJ (US); Christopher M. Perry, Folsom, CA (US); Zhengfang Chen, Millburn, NJ (US); SM Masudur Rahman, Edison, NJ (US); Cory Michael Bruno, South River, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/293,668

(22) Filed: Jun. 2, 2014

(51) Int. Cl.
*H04W 4/00* (2009.01)
*H04W 8/18* (2009.01)
(52) U.S. Cl.
CPC .................................. *H04W 8/18* (2013.01)
(58) Field of Classification Search
CPC . H04W 8/245; H04W 8/265; H04M 1/72525; H04M 3/42178
USPC .................. 455/405, 410–411, 418–420, 455/435.1–435.3, 41.1–41.3
See application file for complete search history.

(56) References Cited

U.S. PATENT DOCUMENTS

| | | | |
|---|---|---|---|
| 2004/0176071 A1* | 9/2004 | Gehrmann et al. | 455/411 |
| 2007/0086372 A1* | 4/2007 | Lee et al. | 370/328 |
| 2008/0045201 A1* | 2/2008 | Kies | 455/420 |
| 2008/0166993 A1* | 7/2008 | Gautier et al. | 455/405 |
| 2008/0167036 A1* | 7/2008 | Bush et al. | 455/435.1 |
| 2008/0261561 A1* | 10/2008 | Gehrmann | 455/411 |
| 2011/0070877 A1* | 3/2011 | Macaluso | 455/419 |
| 2011/0081860 A1* | 4/2011 | Brown et al. | 455/41.3 |
| 2011/0136470 A1* | 6/2011 | Kurz | 455/410 |
| 2011/0159843 A1* | 6/2011 | Heath et al. | 455/411 |
| 2011/0291814 A1* | 12/2011 | Faith | 340/10.5 |
| 2012/0324553 A1* | 12/2012 | Garcia Bernardo et al. | 726/6 |
| 2013/0143527 A1* | 6/2013 | Randazzo et al. | 455/411 |
| 2013/0193203 A1* | 8/2013 | Larson et al. | 235/375 |
| 2014/0045474 A1* | 2/2014 | Cheuk et al. | 455/418 |

(Continued)

*Primary Examiner* — Nathan Taylor

(57) ABSTRACT

An application installed on a mobile device currently activated for service with a mobile wireless communication network captures information uniquely identifying a currently unsubscribed mobile device. The unique information may be captured from the currently unsubscribed mobile device via any of several short range transfer mechanisms. The application transfers the captured information and other information used to activate the currently unsubscribed mobile device to an activation service of the mobile wireless communication network, and the service activates the currently unsubscribed mobile device. In another example, a self-activation portal system determines an identifier of an owner of an account associated with an identifier provided by a user of a mobile device to be activated for use with a mobile wireless service. The system sends a message to the account owner offering options to accept or decline the activation request.

20 Claims, 5 Drawing Sheets

(56) References Cited

U.S. PATENT DOCUMENTS

2014/0057615 A1* 2/2014 Berry et al. .................. 455/418
2014/0106713 A1* 4/2014 Skog et al. ................... 455/411
2014/0106728 A1* 4/2014 Aboulhosn et al. .......... 455/418
2015/0079982 A1* 3/2015 Wu et al. ................... 455/435.1

* cited by examiner

REMOTE DEVICE ACTIVATION

BACKGROUND

In recent years, mobile wireless communications have become increasingly popular. Presently, mobile devices such as laptops, personal digital assistants ("PDAs"), smartphones, cell phones, tablet PCs and other portable computers are rapidly gaining popularity. Mobile devices are available with interfaces enabling communications via mobile networks or local area network (LAN) wireless access points (hereinafter "wireless hotspot networks" or "hotspots"). Currently, mobile networks are operational that conform with the fourth generation (4G) Long Term Evolution (LTE) standard. These mobile networks provide voice communication, messaging, email and internet access (for example) by using radio frequency communication. Communications via hotpots may occur using a communications standard such as IEEE 802.11 ("WiFi") network type wireless access points.

The mobile devices with capability of accessing services through a mobile network or through a hotspot network usually are sold at a point of sale (POS) of the mobile network carrier and activated for voice communication and data transfer at the POS at the time of purchase.

Recently, sales channels have diversified such that buyers can buy the mobile devices via websites and markets other than the POS of the mobile network carrier. In these later purchase channels, a buyer purchases only a mobile device via a website or another non-carrier market without buying a data plan to access the mobile network. Therefore the buyer needs to activate the mobile device on the buyer's own by buying the data plan of the mobile network separately or adding the device to an existing plan (e.g. instead of or in addition to other devices of the user). This type of self-activation by a user, however, may occur a significant amount of time after purchase of the mobile device and requires a user (rather than a salesperson at the POS) to locate and manually input information uniquely identifying the newly purchased mobile device as well as other information used to complete the self-activation. This process of locating and manually inputting the information can be frustrating and error-prone.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

Figure 1:
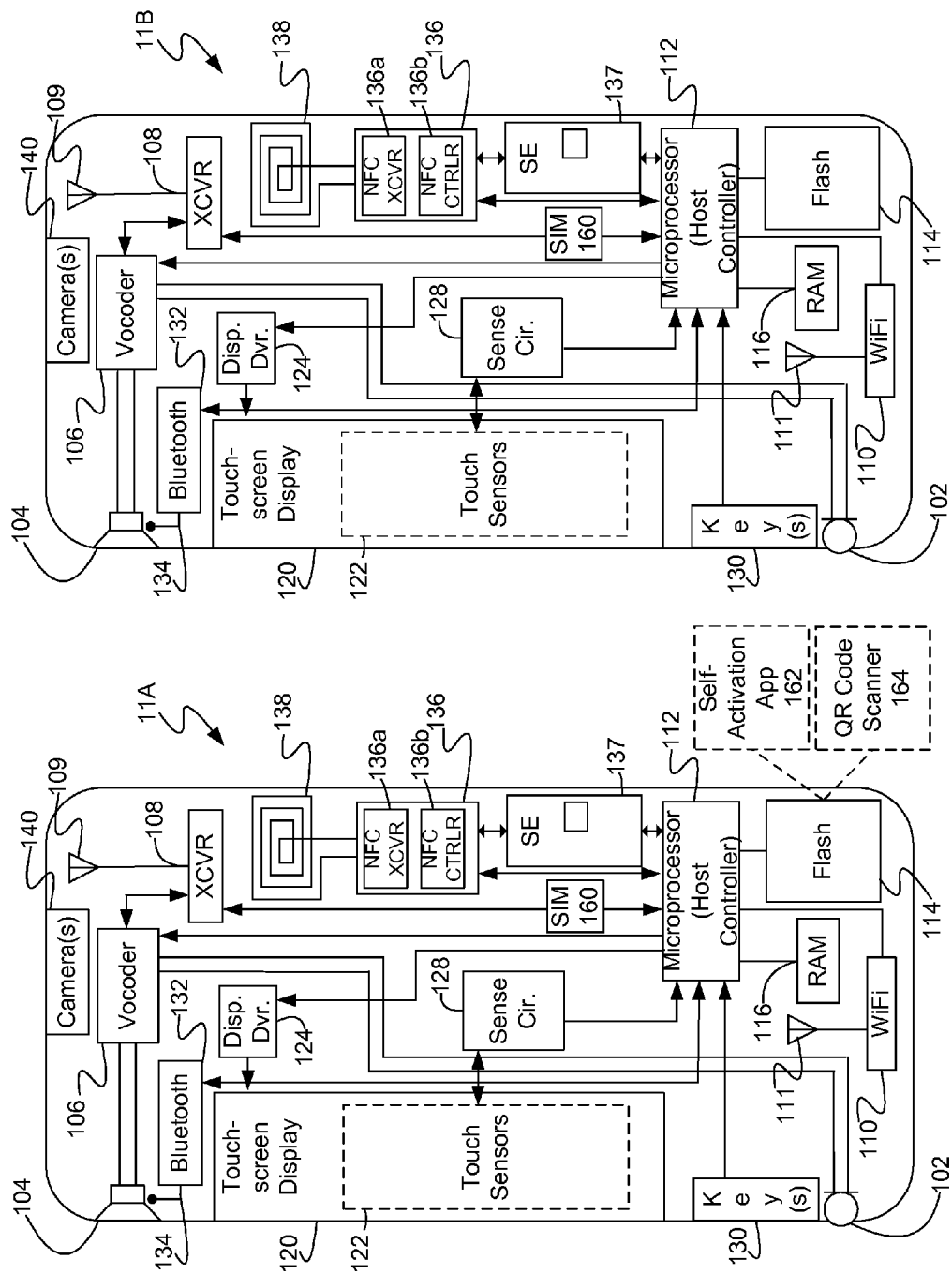
FIG. 1 provides a block diagram illustration of an example of two mobile devices.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The examples described in detail below relate to technology to enable an activated mobile device to automatically capture information uniquely identifying a newly purchased and/or currently unsubscribed mobile device in order to facilitate self-activation of the currently unsubscribed mobile device. The unique identifying information includes, for example, an integrated circuit card identifier (ICCID) of an identity module of the currently unsubscribed mobile device and an international mobile equipment identifier (IMEI) of the currently unsubscribed mobile device. The unique identifying information is captured, for example, in one of various ways including using short range communication methodologies. In some examples, the currently active mobile device utilizes near-field communications (NFC) communications with or pairs via Bluetooth with the currently unsubscribed mobile device to capture the unique identifying information. In another example, the currently active mobile device utilizes a camera to take a picture of the unique identifying information or a quick response (QR) code representing the unique identifying information. The currently active mobile device then utilizes optical character recognition (OCR) or a QR code scanning utility to extract the unique identifying information from the image. In still another example, the currently unsubscribed mobile device and the currently active mobile device each join the same Wi-Fi network and the currently active mobile device requests the unique identifying information from the currently unsubscribed mobile device via the Wi-Fi network. The currently unsubscribed mobile device responds to the request via the Wi-Fi network as well. The request and the response may utilize hyper-text transfer protocol (HTTP) to facilitate communications via the Wi-Fi network.

Once the currently active mobile device has captured the unique identifying information from the currently unsubscribed mobile device, the unique identifying information is transferred, for example, to an activation system of a mobile wireless communication network in order to activate the currently unsubscribed mobile device for service with the mobile wireless communication network. The transfer may include other information to complete the activation. The other information includes, for example, user account credentials of a user responsible for an account with which the currently unsubscribed mobile device will be associated and a plan selection for which the currently unsubscribed mobile device will be activated. The other information may be provided as user input by a user of the currently active mobile device.

Other examples described in detail below also relate to a self-activation portal system for requesting activation of a currently unsubscribed mobile device onto an existing account of a mobile wireless communication network. In one such example, a user of the currently unsubscribed mobile device provides an identifier of a mobile device currently associated with the existing account to the self-activation portal system. The self-activation portal system, in this example, determines an identifier of a mobile device associated with an owner of the existing account. The self-activation portal system sends a message, for example, to the owner of the existing account informing the owner of the activation request and offering the owner an option to either accept or decline the request. Upon acceptance of the request by the owner, the currently unsubscribed mobile device is activated.

Reference now is made in detail to the examples illustrated in the accompanying drawings and discussed below. FIG. 1 illustrates two mobile devices 11A, 11B that facilitate the capture of unique identifying information of one of the mobile devices (e.g., 11B) by the other mobile device (e.g., 11A).

Although FIG. 1 depicts two identical mobile devices 11A, 11B and the same reference numbers are utilized to identify identical elements in each device, this is only for simplicity and no such requirement exists to perform the steps described herein. Each of the mobile devices 11A, 11B may have more or fewer elements than depicted in FIG. 1 and mobile devices 11A, 11B need not have any particular elements in common. Also, the following description will focus on mobile device 11A, but such description can be applied to mobile devices 11A, 11B interchangeably. For purposes of device activation discussions, several later examples assume device 11A has already been activated on a customer or user account with a mobile communication network service provider and that the device 11B is currently unsubscribed or not yet active for network communication with that service provider.

The mobile device 11A includes a microphone 102 for audio signal input and a speaker 104 for audio signal output. The microphone 102 and speaker 104 are communicatively coupled to a voice or audio encoder/decoder (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some types of transaction communications.

Also, as shown in FIG. 1, mobile device 11A includes at least one digital transceiver (XCVR) 108, for digital wireless communications via a wide area wireless mobile communication network, although the mobile device 11A may include additional digital or analog transceivers (not shown). The transceiver 108 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 108 provides two-way wireless communication of information including digitized audio signals, still image and/or video signals, web page information for display as well as web related inputs, and various types of mobile message communications to/from the mobile device 11A.

In one example, the transceiver 108 sends and receives a variety of signaling messages in support of various voice and data services provided by a network of a wireless service provider, to a user of mobile device 11A via the mobile communication network. Transceiver 108 connects through radio frequency (RF) send-and-receive amplifiers (not separately shown) to an antenna 109. Transceiver 108 may also support various types of mobile messaging services, such as short message service (SMS), enhanced messaging service (EMS), and/or multimedia messaging service (MMS). The network permits such communications of device 11A because device 11A has been activated on an account with the network. Except possibly for emergency communications and/or activation communications, the network will not allow access by mobile device 11B because device 11B has not yet been activated with the network.

Many modern mobile devices also support wireless local area network communications over Wi-Fi, instead of or in addition to data communications using the wide area mobile communication network. Hence, in the example of FIG. 1, for packet data communications, the exemplary mobile device 11A may also include a Wi-Fi transceiver 110 and associated antenna 111. Although Wi-Fi is used here as the example, the transceiver 110 may take the form of any available two-way wireless local area network transceiver of a type that is compatible with one or more standard protocols of communication implemented in wireless local area networks, such as one of the Wi-Fi standards under IEEE 802.11 and/or WiMAX. The transceiver 110, for example, may provide two-way data transport for wireless communication with a wireless access point in a residence or enterprise that the user frequents or with any available hotspot offered in a public venue. For example, transceiver 110 allows mobile device 11A to request information, such as unique identifying information, and receive a response containing such information from mobile device 11B in order to facilitate activation of mobile device 11B as described further below. Although communicating through a different network or networks, the transceiver 110 supports various types of data communications similar to the packet data communications supported via the mobile network transceiver 108.

The mobile device 11A further includes a microprocessor, sometimes referred to herein as the host processor 112, which serves as a programmable controller for mobile device 11A by configuring mobile device 11A to perform various operations, for example, in accordance with instructions or programming executable by processor 112. Depending on the type of device, the mobile device 11A stores and runs an operating system through which specific applications may be run on the device. Examples of operating systems include Android, Apple iOS (iPhone or iPad devices), Windows Mobile, RIM BlackBerry operating system, or the like. Program controlled operations, for example, may include various general operations of the mobile device 11A as well as operations related to the capture of information uniquely identifying another mobile device, such as unsubscribed mobile device 11B, as described in greater detail herein. A flash memory 114 is used to store, for example, programming or instructions for execution by the processor 112, such as self-activation app 162 and/or QR code scanner 164, in the case of the activated device 11A. The unsubscribed mobile device 11B may not yet have a self-activation app 162 and/or QR code scanner 164 stored in its memory. Flash memory 114 may also be used to store mobile configuration settings for different mobile applications or services executable at mobile device 11A (using processor 112). Mobile device 11 may also include a non-volatile random access memory (RAM) 116 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to implement the interaction with another mobile device, such as mobile device 11B, and related transactions, as described herein. Program aspects of the technology may be thought of as "products" or "articles of manufacture" typically in the form of executable code or process instructions and/or associated data that is stored on or embodied in a type of machine or processor readable medium.

A mobile device supporting the capture of unique identifying information from another mobile device under consideration here may include a variety of different types of user interface elements. For discussion purposes, in the smart phone example shown in FIG. 1, the user interface elements of mobile device 11A include a touch screen display 120 (also referred to herein as "touch screen 120" or "display 120"). For output purposes, the touch screen 120 includes a display screen, such as a liquid crystal display (LCD) or the like. For input purposes, touch screen display 120 includes a plurality of touch sensors 122. Other interface elements may include a keypad including one or more keys 130. For example, the keypad may be implemented in hardware as a T9 or QWERTY keyboard of mobile device 11A and keys 130 may correspond to the physical keys of such a keyboard. Alternatively, keys 130 (and keyboard) of mobile device 11A may be implemented as "soft keys" of a virtual keyboard graphically represented in an appropriate arrangement via touch screen display 120. The soft keys presented on the touch screen display 120 may allow the user of mobile device 11A to invoke the same user interface functions as with the physical hardware keys. In some implementations, the microphone 102 and speaker 104 may be used as additional user interface elements, for audio input and output, including with respect to some functions related to the capture of information and communication, as described herein.

In addition, mobile device 11A has one or more image capture sensors 140 (e.g., camera(s)) to capture images for further processing by microprocessor 112. Such captured images may serve as input and thus, camera(s) 140 serve as an additional user input element for mobile device 11A. As discussed more later, several examples use image capture as part of procedures to capture unique identifying information from unsubscribed mobile device 11B, e.g. from display 120 of that device 11B.

For output, touch screen display 120 is used to present information (e.g., text, video, graphics or other visible content) to the user of mobile device 11A. Host processor 112 controls visible display output on the LCD or other display element of the touch screen display 120 via a display driver 124, to present the various visible outputs to the device user.

In general, touch screen display 120 and touch sensors 122 (and one or more keys 130, if included) are used to provide the textual and graphical user interface for the mobile device 11A. In an example, touch screen display 120 provides viewable content to the user at mobile device 11A. Touch screen display 120 also enables the user to interact directly with the viewable content provided in the content display area, typically by touching the surface of the screen with a finger or an implement such as a stylus. Of note, when activation processing calls for user input, the touch screen display and/or voice input via microphone 102 may facilitate such input, e.g. in response to device outputs of appropriate prompts.

As shown in FIG. 1, the mobile device 11A also includes a sense circuit 128 coupled to touch sensors 122 for detecting the occurrence and relative location/position of each touch with respect to a content display area of touch screen display 120. In this example, sense circuit 128 is configured to provide processor 112 with touch-position information based on user input received via touch sensors 122. In some implementations, processor 112 is configured to correlate the touch position information to specific content being displayed within the content display area on touch screen display 120. The touch-position information captured by sense circuit 128 and provided to processor 112 may include, but is not limited to, coordinates identifying the location of each detected touch with respect to the display area of touch screen display 120 and a timestamp corresponding to each detected touch position.

The user interface capabilities of the mobile device 11A provide output to and receive input from the user of the mobile device 11A, for any of the various functions, operations or applications of the device. For example, programming (discussed more later) that configures the mobile device 11A to capture and act on information from another mobile device, such as mobile device 11B, and causes the mobile device to perform an activation function may include further acknowledgment requests from the user.

The mobile device 11A also has near-field communication (NFC) communication capability. NFC may be used for a variety of different functions or applications of the mobile device 11A for data communication with various other types of equipment. However, for purposes of this discussion, the mobile device 11A interacts with another mobile device, such as mobile device 11B, via the NFC communication capability of the mobile device 11A. Some activation examples use this NFC communication between devices 11A and 11B, e.g. to capture unique identifying information from mobile device 11B; although such device to device communication via NFC is useful for many other purposes/applications.

NFC is a set of standards for smart phones and similar devices, such as the exemplary mobile device 11A discussed here, to establish radio communication with other such devices as well as with compatible NFC readers by coming to close proximity (e.g., 4-10 cm or less). Due to its short range and support for encryption, NFC communication is suitable for secure communication over short distances. Each NFC enabled mobile device or NFC enabled device (e.g., a smart poster, a contactless terminal such as that at a point of sale, etc.,) includes a transceiver configured to communicate with other NFC capable equipment.

Hence, the exemplary mobile device 11A further includes an NFC sensor. The NFC sensor may be implemented in a variety of ways. In the exemplary mobile device 11A of FIG. 1, the NFC sensor includes an NFC type radio frequency transceiver 136a, which is formed by an NFC chipset 136. The NFC chipset 136 provides two-way wireless communication of information in accordance with NFC technology and protocols. The NFC chipset 136 includes an NFC controller 136b. For simplicity, the NFC chipset 136 is sometimes referred to herein as the NFC controller 136, while it will be understood that it is a controller within the NFC chipset 136. The exemplary NFC sensor also includes an antenna, such as coil antenna 138. The NFC chipset 136 of device 11A connects to the NFC coil antenna 138, for transmitting and receiving NFC communications to/from other NFC compatible devices with compatible transceivers over short air link distances. The transceiver 136a formed by the NFC chipset 136 also sends and receives a variety of signaling messages for establishing NFC links with other NFC-enabled devices and sends and receives various user data over the established NFC links. The signaling, for example, may allow the transceiver formed by the NFC chipset 136 to detect proximity of another NFC capable device, establish an NFC link with the other device, trigger execution of an appropriate application, such as an application to support the capture of unique identifying information from another mobile device, such as mobile device 11B, described below, within the mobile device 11A and send and/or receive data for the information capture application as between the mobile device 11A and the other NFC capable device. Some modern mobile devices are already coming equipped with such NFC equipment, and increased NFC deployment is expected in the near future.

In order to run secure applications such as capturing unique identifying information from another mobile device, such as mobile device 11B, and the like, there is a Secure Element (SE) 137. In one example, the SE 137 is a separate chip that includes tamperproof storage and execution memory and is configured to communicate with an NFC controller 136b (a secure processor). The NFC controller 136b is different from the host processor 112 in that it focuses on enabling secure transactions. The SE 137 contains applications (e.g., applets) that use secure keys running inside the secure processor. For example, there may be at least one applet for processing of at least one type of communication, such as the transfer of captured information to an activation system of the mobile wireless communication network described below.

For example, the applications that run on the SE typically run on a Javacard operating system. The SE 137 may include various account information, such as account number, user identification, a personal identification number (PIN), or the like for user verification and possibly account balance and/or transaction record information. The SE 137 may be used to decode credentials of NFC enabled devices. In various examples, the secure element may be part of a subscriber identification module (SIM) chip, such as SIM 160 described below, or a separate secure element like a secure digital (SD) memory card used for storing and accessing applications and data in a secure manner.

The mobile device 11A in this example also has a short-range transceiver 132 configured to both transmit and receive signals via antenna 134. For example, the short-range transceiver may be a Bluetooth device and may communicate with another mobile device, such as mobile device 11B, which also has a Bluetooth-enabled short-range transceiver. In one example, the Bluetooth-enabled short-range transceiver 132 of mobile device 11A is paired with a Bluetooth-enabled short-range transceiver of another mobile device, such as mobile device 11B, and unique identifying information of the other mobile device is captured utilizing Bluetooth communications.

Mobile device 11A includes a subscriber identity module (SIM) 160. The SIM 160 is an identity chip or module containing information used to unique identify mobile device 11A, such as an international mobile equipment identifier (IMEI). A similar module, for example, is sometimes referred to as a Universal Integrated Circuit Card (UICC) and unique identified by a UICC identifier (UCCID). Thus, in one example, mobile device 11A is uniquely identified by an IMEI and the identity chip or module is uniquely identified by a UCCID. The SIM 160 provides user account information and secure storage, including secure storage for an IMEI and/or a UCCID. The SIM 160 is a computer itself with internal processor and storage elements (not individually shown).

In various examples, SIM 160 of mobile device 11A is activated and provisioned with data and/or configuration settings such that device 11A accesses services provided by and/or via a mobile wireless communications network. In these examples, mobile device 11B also includes a SIM 160, however, SIM 160 of mobile device 11B is not activated and is not provisioned with data and/or configuration settings such that device 11A cannot access services provided by and/or via the mobile wireless communication network.

Figure 2:
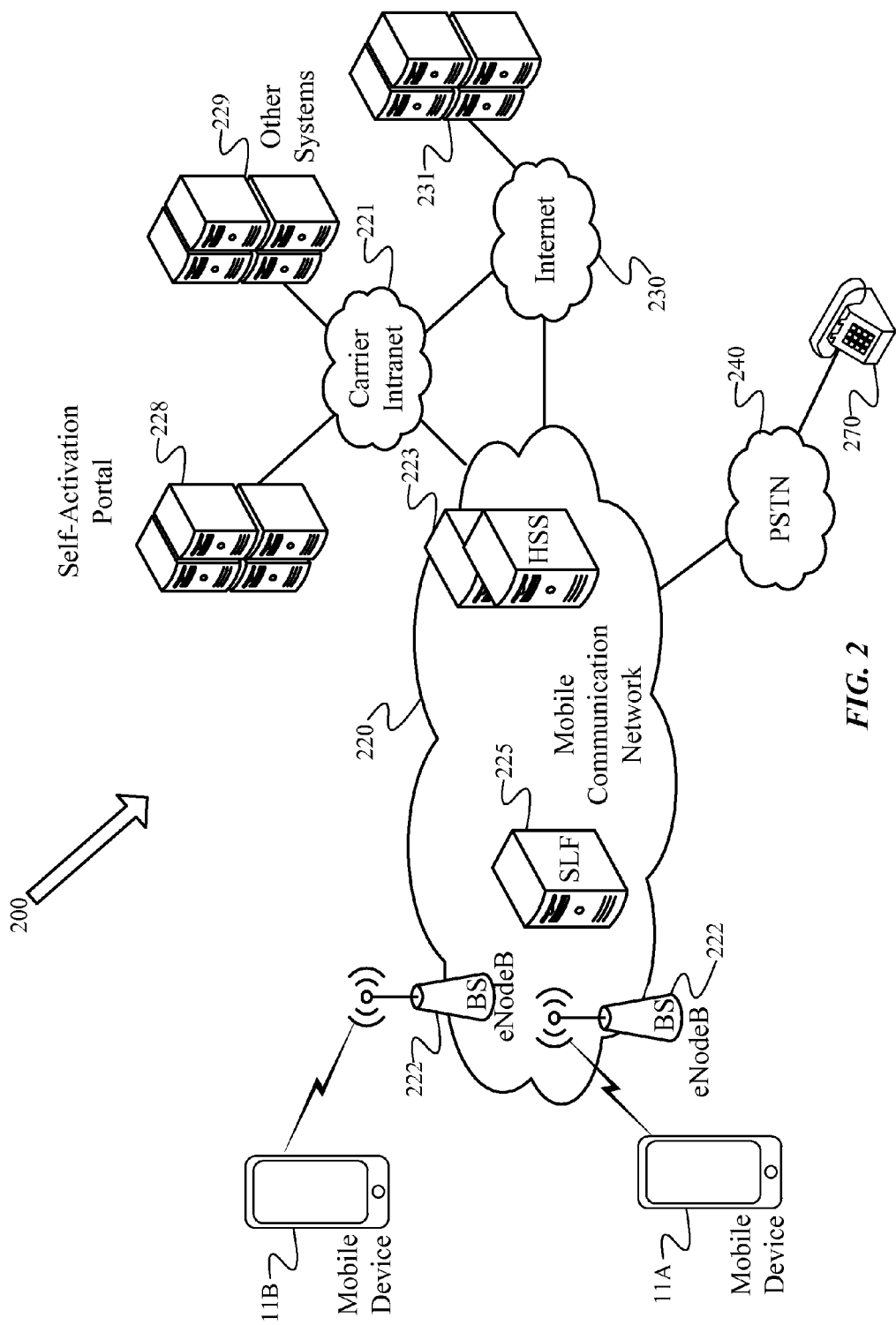
FIG. 2 is a functional block diagram of an example of a system which may implement a self-activation portal for activation of a mobile device.

FIG. 2 is a functional block diagram of an example of a system 200 that supports various mobile communication services and which may implement a self-activation portal for activation of a mobile device, such as mobile devices 11A, 11B.

The illustrated system 200 services any number of mobile devices, including the illustrated mobile devices 11A, 11B. Each mobile device may be a laptop, a personal digital assistant ("PDA"), a smartphone, a tablet PC or another portable device designed to communicate via a wireless network, such as mobile devices 11A, 11B of FIG. 1. Each of the mobile devices 11A, 11B in our example corresponds to a smartphone or tablet itself having network communication capability and a user interface, which in this discussion, may be used in the self-activation procedures. Although not shown for simplicity, the present activation techniques also may be used to activate other types of devices onto the network, for example, to activate mobile broadband devices like Jetpacks® or USB dongles that provide service connectivity for other types of data devices (e.g. non-mobile/wireless computers or the like).

The illustrated system example includes a mobile communication network 220, in this example, operated in accordance with 4G LTE standards. Mobile network 220 may provide mobile telephone communications as well as Internet data communication services. For example, mobile network 220 may connect to the public switched telephone network (PSTN) 240 (eventually connecting to PSTN device 270) and public packet-switched data communication networks such as the Internet 230. Data communications via mobile network 220 provided for users of devices like mobile devices 11A, 11B may support a variety of services such as communications of text and multimedia messages, e-mail, web browsing, streaming or downloading content, etc. with network connected equipment represented generically by the server 231 in the drawing. Voice communication also may involve transport via the Internet 230 using voice over Internet Protocol (VoIP) technologies. Mobile devices 11A, 11B may connect to mobile network 220 through a cellular base station 222, two of which appear in the drawing by way of example.

For convenience only, the drawings and description use terms like base station (BS) originally developed to describe elements of older mobile network technologies. The terms are used here, however, in a broader sense to also encompass equipment used for similar wireless link and routing/control purposes in more modern network technologies. In a 4G wireless network, for example, each wireless access node corresponding to one of the illustrated base stations may take the form of a node referred to as an eNodeB, and the wireless mobile devices are types of user equipment (UE) devices. Packet routing and control functions may be implemented in packet routers and/or associated server platforms in the radio access network (RAN) or in many cases in elements of an IP Multimedia Service (IMS) core network (not shown separately) coupled to some number of 4G RANs, although such routing and control element(s) are generically included in the broad class of devices that may be used to implement the network functionality discussed here.

The carrier that operates the network 220 will also utilize a variety of other systems for related purposes, such as maintenance, accounting and provisioning. In the example, the carrier has another data network, e.g. Intranet 221, that provides data communications for other data systems used by the carrier, and that network 221 has connectivity into the network 220 that provides the actual communications services to the carrier's customers. For purposes of the present discussion, equipment communicating via the network 221 includes a self-activation portal server 228 as well as a number of other systems that will be involved in provisioning and the like in the self-activation process. The other systems for provisioning, etc. are shown collectively at 229 in FIG. 2.

The self-activation portal 228, in the examples, is a server functionality implemented on one or more network connected computers. The self-activation app 162 is, for example, an application installed on mobile device 11A that facilitates the capture of unique identifying information from another mobile device, such as mobile device 11B, that is not currently activated for services by the mobile wireless communication network. The self-activation app 162 implements client functionality on the mobile device 11A for interaction with the server functionality of the self-activation portal 228 in order to complete activation of the currently unsubscribed mobile device. Alternatively, or in addition to, mobile device 11B, in one example, is not currently activated for services by the mobile wireless communication network, but mobile device 11B is allowed to communicate with the self-activation portal 228 (e.g., via a web browser operated on mobile device 11B) in order to request activation of mobile device 11B directly.

The self-activation portal 228, for example, supports the self-activation system by receiving messages from the mobile device 11B and by sending messages to the mobile device 11B (e.g., via hyper-text transfer protocol (HTTP)). The self-activation portal 228, in the examples, also contains client functionality to interact with other elements within the network 220 and/or the network 221 for completing the self-activation process.

For authentication and authorization purposes, the network 220 includes a number of home subscriber servers. A home subscriber server (HSS) is an example of a computer or the like that maintains account or customer related service profile records associated with mobile devices that are allowed access to communication service through the mobile network. Of note for purposes of the present discussion, the HSS operates as a control point for providing instructions to other network elements, based on the profile records, so that the network delivers communications services to the mobile devices in accordance with the respective profile records.

In the network 220 in our example, an HSS is a platform that stores a database of profile records for mobile devices, such as mobile device 11A, authorized for service through the network 220. An HSS provides data upon request to enable session control elements (not separately shown) to control the flow of sessions through the 4G LTE network 220 for the mobile devices, e.g. to authenticate a particular mobile device and to indicate that the mobile device is or is not authorized to utilize a particular network service. The HSS profile record for a mobile device may include relevant identification information, subscription information and possibly information about the location of the device and/or IP (Internet Protocol) address assignment information. A large network deployment, for serving a substantial number of mobile devices, includes a number of actual call processing HSS servers, two of which are shown at 223 in the drawing. Each activated mobile device, such as mobile device 11A, will have a record stored in one of the databases of the HSS servers 223. The network 220 will not provide service to a mobile device unless the mobile device has a record in an HSS and may even terminate an ongoing session when a record for the mobile device is deleted from an HSS.

During actual processing of a call session, a server configured as a Subscriber Location Function (SLF) identifies which of the HSSs 223 to use for services of a particular mobile device. The example network 220 uses a Diameter Routing Agent (DRA) as the implementation of the SLF function, as shown at 225 in FIG. 2. Each activated mobile device, such as mobile device 11A, will have an entry in the mapping table(s) of the DRA SLF 225 to point to the one of the HSSs 223 having the service profile record for that device.

Thus, in order for mobile devices 11A, 11B to receive services via network 220, a corresponding profile record for mobile devices 11, 11B exists in at least one HSS 223 and an entry in the mapping table of an SLF 225 points to the corresponding HSS 223. As described in greater detail below, with regard to FIG. 3, a self-activation app 162 installed on mobile device 11A facilitates, for example, capturing unique identifying information of another mobile device 11B such that an appropriate profile record for the other mobile device 11B may be created. Alternatively, or in addition, as described in greater detail below with regard to FIG. 4, self-activation portal 228 facilitates receiving an activation request from mobile device 11B for which a profile record does not currently exist in HSS 223 and providing notification of the activation request to an owner of an account which may accept the activation request. Upon acceptance of the activation request by the account owner, the self-activation portal 228 facilitates creating the appropriate profile record and populating the record into HSS 223.

Figure 3:
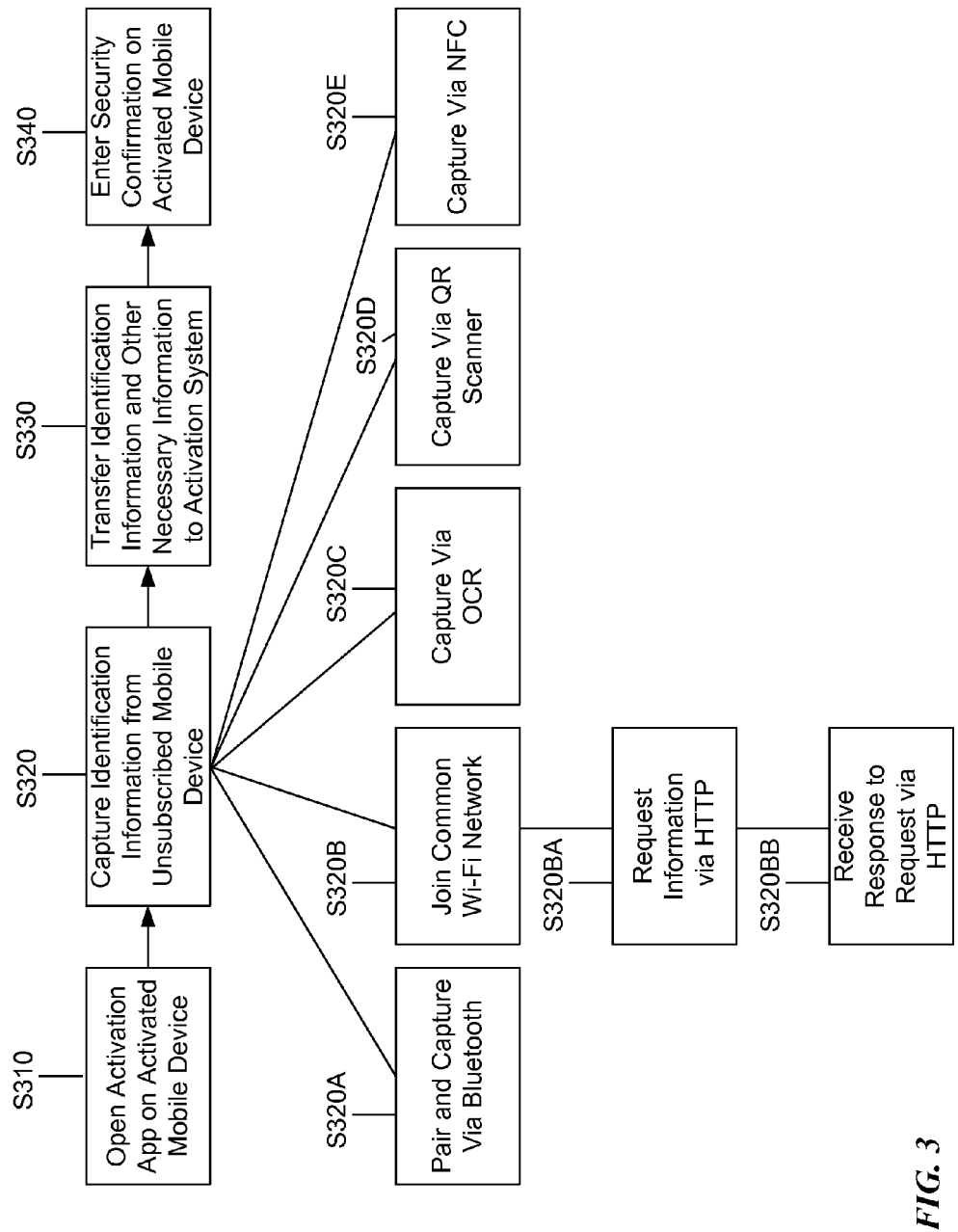
FIG. 3 is a flow diagram of an example of a process for capturing unique identifying information from an unsubscribed mobile device by an active mobile device in order to activate the unsubscribed mobile device with a mobile wireless communication service.

FIG. 3 is a flow diagram of an example of a process for capturing unique identifying information from an unsubscribed mobile device, such as mobile device 11B, by an active mobile device, such as mobile device 11A, in order to activate the unsubscribed mobile device with a mobile wireless communication service.

In this example, at step S310, a user opens self-activation app 162 on a mobile device, such as mobile device 11A, currently activated for services provided by mobile wireless communication network 220. In step S320, self-activation app 162 on the activated mobile device, such as device 11A, captures unique identifying information from a mobile device, such as mobile device 11B, that is currently not activated for services provided by mobile wireless communication network 220. The self-activation app 162 captures the unique identifying information from the unsubscribed mobile device in one or some combination of various ways, as referenced in steps S320A-S320E and described below. The unique identifying information includes the ICCID of the identity module of the unsubscribed mobile device and the IMEI of the unsubscribed mobile device, e.g. from the SIM 160 and/or SE 137 of the device 11B.

For example, in step S320A, Bluetooth is utilized to pair and capture the unique identifying information. In this example, when the activation app is opened, a number of options for information capture are presented to the user. The user selects Bluetooth as the information capture option, after which the device may request confirmation of the information capture option. The user then enables Bluetooth on the unsubscribed mobile device, such as mobile device 11B, and, using the short-range transceiver 132 and antenna 134 of each mobile device, the mobile devices 11A, 11B are paired. The active mobile device, such as mobile device 11A, then requests and captures the unique identifying information via Bluetooth from the unsubscribed mobile device, such as mobile device 11B.

In an alternate example, in step S320B, the active mobile device, such as mobile device 11A, and the unsubscribed mobile device, such as mobile device 11B, each join a common Wi-Fi network. For example, each mobile device utilizes their respective Wi-Fi transceiver 110 to associate with a common Wi-Fi hotspot. Alternatively, an ad-hoc Wi-Fi network may be created by configuring Wi-Fi transceiver 110 of one mobile device, such as mobile device 11B, as a Wi-Fi hotspot and associating Wi-Fi transceiver 110 of the other mobile device, such as mobile device 11A, to the ad-hoc Wi-Fi hotspot. In step S320BA, the active mobile device, such as mobile device 11A, requests the unique identifying information via Wi-Fi from the unsubscribed mobile device, such as mobile device 11B, and, in step S320BB, the active mobile device, such as mobile device 11A, receives a response to the request containing the unique identifying information via Wi-Fi. The request and response, in one example, are exchanged via hyper-text transfer protocol (HTTP) over Wi-Fi.

As another example, in step S320C, the active mobile device, such as mobile device 11A, utilizes camera 140 to capture an image of the unique identifying information of the unsubscribed mobile device, such as mobile device 11B. For example, the unsubscribed mobile device, such as mobile device 11B, may display its unique identifying information using touchscreen display 120; and the active mobile device 11A captures an image of the information as it is being displayed. Alternatively, or in addition, the information may be printed on the unsubscribed mobile device (e.g., on the rear case, within a battery compartment, etc.) and/or on packaging originally containing the unsubscribed mobile device. Once the active mobile device captures the image of the information, microprocessor 112 utilizes optical character recognition (OCR) to extract the information from the image.

In step S320D, instead of capturing an image of the information, the active mobile device, such as mobile device 11A, utilizes camera 140 to capture an image depicting a quick response (QR) code. The QR code represents the unique identifying information. As in step S320C, the QR code may be displayed on touchscreen display 120 of the unsubscribed mobile device, printed on the unsubscribed mobile device, and/or printed on packaging originally containing the unsubscribed mobile device. Once the active mobile device captures the QR code image, microprocessor 112 utilizes QR code scanner 164 to extract the information from the QR code image.

In yet another alternate example, in step S320E, near-field communication (NFC) communications are utilized to capture the unique identifying information. In this example, an active mobile device, such as mobile device 11A, is brought into close proximity of an unsubscribed mobile device, such as mobile device 11B, and, utilizing the respective NFC transceiver 136a and NFC controller 136b of each mobile device, the mobile devices 11A, 11B exchange appropriate information to establish a temporary channel of communication. The active mobile device, such as mobile device 11A, then captures the unique identifying information via NFC from the unsubscribed mobile device, such as mobile device 11B.

Once the active mobile device, such as mobile device 11A, has captured the unique identifying information of the unsubscribed mobile device, such as mobile device 11B, the identifying information, along with other information, is transferred, in step S330 to an activation system, such as self-activation portal 228, of the mobile wireless communication network 220. The other information includes, for example, user account credentials of a user responsible for an account associated with the active mobile device under which the unsubscribed mobile device will be activated and a plan selection for which the unsubscribed mobile device will be activated. The account may be identified, for example, by a mobile directory number (MDN) or other identifier of the active mobile device 11A. Other information may be received, for example, as user input from a user of the active mobile device. For example, the user utilizes touchscreen display 120 of the active mobile device, such as mobile device 11A, to enter the other information as responses to prompts provided by the activation app as part of step S330. The identifying information and other information are transferred to the activation system as part of the same transmission of step S330.

Once the activation system of the mobile wireless communication network 220 receives the unique identifying information and the other information used to activate the unsubscribed mobile device, the activation system prompts the user of the active mobile device to enter a security confirmation. In step S340, the user of the active mobile device enters the security confirmation. In one example, the security confirmation is a password, PIN and/or other credential associated with the user and created by the user when the account is first established or at some time prior to or as part of the first use of self-activation app 162. The password, PIN and/or other credential is, for example, the primary account credential. Alternatively, or in addition, the password, PIN and/or other credential is, for example, an additional credential created specifically to facilitate activation(s) via self-activation app 162. In this example, the user utilizes touchscreen display 120 to enter the security confirmation, and the active device 11A sends the confirmation through the network(s) to the portal 228.

In this way, unique identifying information is captured from an unsubscribed mobile device, such as mobile device 11B, by an active mobile device, such as mobile device 11A, without requiring a user to manually enter the information, thus avoiding human error and/or frustration.

Figure 4:
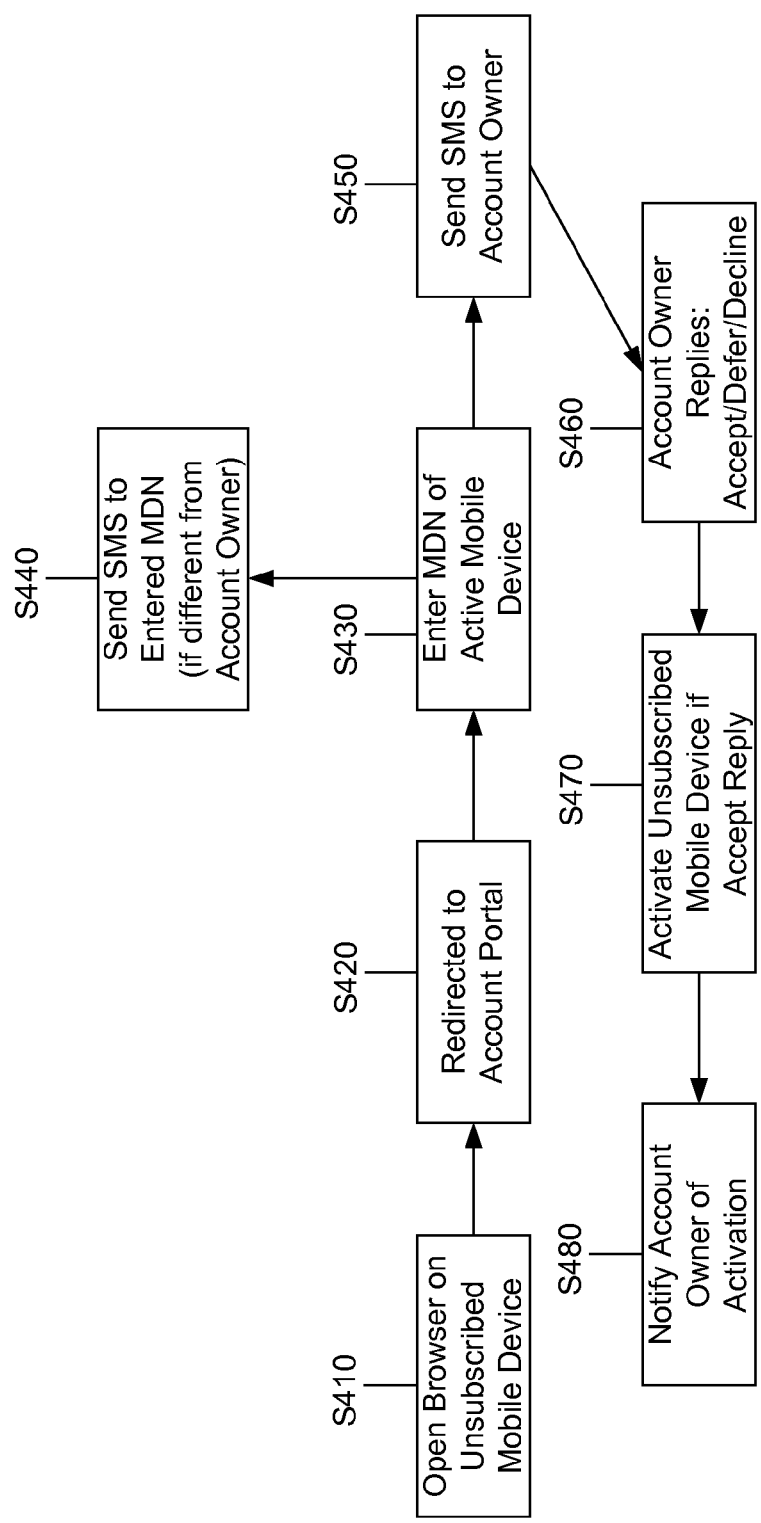
FIG. 4 is a flow diagram of an example of a process for utilizing a self-activation portal to activate a mobile device.

FIG. 4 is a flow diagram of an example of a process for utilizing a self-activation portal to activate a mobile device. While FIG. 3 depicts a process whereby an active mobile device captures information from an unsubscribed mobile device in order to complete an activation of the unsubscribed mobile device, FIG. 4 depicts a process whereby the unsubscribed mobile device is directly utilized for activating the unsubscribed mobile device.

In one example, in step S410, a user opens a web browser on a mobile device, such as mobile device 11B, that is not currently subscribed for services with mobile wireless communication network 220. In step S420, the web browser is redirected to the self-activation portal 228 by mobile wireless communication network 220. For example, SLF 225 determines that a mapping for the unsubscribed mobile device does not exist and thus, the unsubscribed mobile device is only allowed to communicate through the network to access the self-activation portal 228.

As part of step S420, the self-activation portal 228 presents a web page via the device browser to the user of the unsubscribed mobile device, informing the user that the mobile device is not activated for services with mobile wireless communication network 220. The presented web page prompts the user to access the user's account by entering the user's credentials (e.g., username and password) in order to activate the unsubscribed mobile device on an existing account. Alternatively, or in addition, the presented web page allows the user to enter an identifier of a mobile device that is currently activated for services with the mobile wireless communication network 220. The identifier is, for example, a mobile directory number (MDN) or mobile telephone number (MTN) associated with a mobile device, such as mobile device 11A, that is currently activated for services. The currently active mobile device is, for example, another mobile device associated with the user of the currently unsubscribed mobile device or a mobile device associated with an owner of, or other responsible person associated with, an account of mobile wireless communication network 220. That is, the user of the unsubscribed mobile device may not be the owner of the account to which the unsubscribed mobile device will be associated when it is activated for services. However, the owner of the account is made aware of the activation request in order to authorize the activation.

In step S430, the user enters an identifier of an active mobile device, such as mobile device 11A. For example, the user of the unsubscribed mobile device is also the account owner. In this example, the user/account owner enters an identifier of an active mobile device of the user/account owner. Alternatively, the user of the unsubscribed mobile device is not the account owner, such as being a child of the account owner. In this alternate example, the user enters an identifier of an active mobile device of the account owner or an identifier of an active mobile device of the user.

As part of S430, self-activation portal 228 determines, for example, the appropriate existing account and whether the entered identifier is associated with an active mobile device of the owner of the account to which the unsubscribed mobile device will be associated. If the entered identifier is not associated with an active mobile device of the owner of the account, self-activation portal 228 sends a message, in step S440, to the entered identifier informing the user that the owner of the account will be informed of the activation request. The message is, for example, sent via short message service (SMS) or multimedia message service (MMS) to the user's active device with the identifier.

The self-activation portal 228 also determines, as part of step S430, an identifier associated with an active mobile device of the owner of the account. The determined identifier may be the same as the entered identifier, for example, if the user is the account owner, or the determined identifier may be different from the entered identifier, for example, if the user is not the account owner. In either case, in step S450, a message is sent to the determined identifier of the account owner. The message is, for example, sent via short message service (SMS) or multimedia message service (MMS) to the account owner's mobile device. The message, in one example, informs the account owner of the activation request. In a further example, the message offers the account owner options as to whether or not to accept the request to activate the otherwise unsubscribed device. The account owner has the option, for example, to accept the activation request, decline the activation request, or defer responding. Alternatively, or in addition, the account owner may indicate that a one-time password or PIN is to be generated and sent to the user requesting activation.

In step S460, the account owner replies, for example, by selecting one of the options in the message. The account owner's mobile device sends a message indicating the owner's selected option back through the network to the activation portal 228, e.g. as a responsive SMS message. If the account owner declines or defers responding to the activation request, the process ends and the unsubscribed mobile device remains unsubscribed. In one example, after the user enters the identifier in step S430 and while steps S440-S460 are being performed, self-activation portal 228 presents a web page via the device browser to the user of the unsubscribed mobile device, informing the user that the various steps are being performed. In this example, if the account owner declines or defers responding to the activation request, the presented web page is updated to reflect the account owner's action. Further in this example, although services provided by mobile wireless communication network 220 are not otherwise available to the unsubscribed mobile device, the user is able to continue to perform other functions of the unsubscribed mobile device.

If the account owner accepts the activation request, the process continues to step S470. In step S470, the self-activation portal 228 receives the account owner's acceptance reply and activates the unsubscribed mobile device on the account. As part of the activation, for example, mobile device 11B is provisioned with the appropriate information to facilitate communications with the network; an appropriate profile record is created and populated into HSS 223; and an appropriate mapping is created in SLF 225. Once activation is complete, the account owner is notified, for example, in step S480.

In this fashion, a user, who may or may not be the account owner, can request activation of a mobile device, such as mobile device 11B, that is not currently activated for services. The account owner is notified of the activation request and provided several options regarding the activation request. If the account owner accepts the activation request, activation is performed by communication with a self-activation portal and the activated mobile device is associated with the account. After activation and association with the account, the account owner is responsible for any related activity by the activated mobile device (e.g., bill payment, usage, overages, marketing, etc.).

As shown by the discussion of self-activation above, a variety of the functions involved are implemented on network elements, carrier operated data equipment and/or mobile devices. Although special purpose devices may be used, some or all of the network elements and/or carrier operated data equipment also may be implemented using one or more hardware platforms intended to represent a general class of data processing device commonly used to run "server" programming so as to implement the self-activation related functions discussed above, albeit with an appropriate network connection for data communication. Although the examples of the mobile device discussed in the most detail above included user interface elements, the self-activation technique may also apply to other types of mobile devices (e.g. a Jetpack® or USP dongle). For such another device activation, the mobile device that is being activated may be connected (at least temporarily) to other user equipment that provides the user interface. Such other user equipment, for example, may be a user terminal type of general purpose computer.

Figures 5, 6:
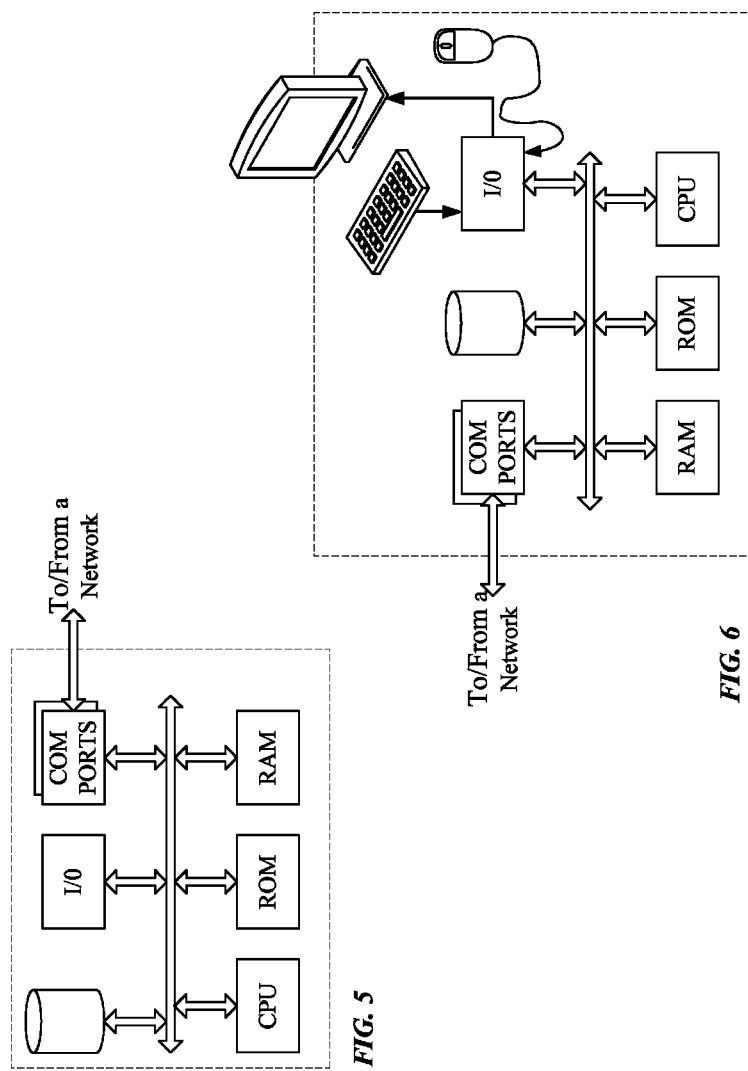
FIG. 5 provides a block diagram of a general purpose computer hardware platform that may be configured as a host or server, for example, to function as any of the server computers shown in FIG. 2.
FIG. 6 is a simplified functional block diagram of a personal computer or other work station or terminal device.

FIG. 5 provides a functional block diagram illustration of a general purpose computer hardware platform. More specifically, FIG. 5 illustrates a network or host computer platform, as may typically be used to implement a server, such as self-activation portal 228 and/or any of the other servers/platforms implementing the self-activation portal 228 and the activation related functions shown in FIGS. 2 and 4. FIG. 6 depicts a computer with user interface elements, as may be used to implement a personal computer or other type of work station or terminal device, although the computer of FIG. 6 may also act as a server if appropriately programmed. It is believed that the general structure and general operation of such equipment as shown in FIGS. 5 and 6 should be self-explanatory from the high-level illustrations.

A server, for example, includes a data communication interface for packet data communication (see FIG. 5). The server also includes a central processing unit (CPU), in the form of one or more processors, for executing program instructions. The server platform typically includes an internal communication bus, program storage, and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. The software programming relating to the self-activation techniques discussed herein may be downloaded and/or updated from a computer platform, for example, to configure the self-activation portal or other server (e.g. FIG. 2) or from a host computer or the like communicating with the mobile device (e.g. FIG. 1) via the network (e.g. FIG. 2) to download the activation application.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of self-activation and related communications outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory or tangible storage media, more general terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
    a communication interface system, including at least one wireless communication transceiver;
    at least one user interface element configured to receive user input and to provide output to a user of the mobile device;
    a memory;

a processor coupled to the communication interface system and the at least one user interface element; and a mobile device activation application stored in the memory, where execution of the mobile device activation application by the processor configures the processor:

capture, from a currently unsubscribed mobile device that is currently unsubscribed with respect to a mobile wireless communication network, information uniquely identifying the currently unsubscribed mobile device;

receive, via the at least one user interface element, user input identifying other information used to activate the currently unsubscribed mobile device by associating the currently unsubscribed mobile device with a registered account, associated with the mobile device, for the mobile wireless communication network, the other information including information identifying the registered account, the registered account, associated with the mobile device, permitting the mobile device to access the mobile wireless communication network;

transfer, to a mobile device activation platform of the mobile wireless communication network via the at least one wireless communication transceiver, the information uniquely identifying the currently unsubscribed mobile device and the other information; and provide, to the mobile device activation platform via the at least one wireless communication transceiver, a user security confirmation received as user input by the at least one user interface element, the mobile device being currently subscribed and activated with respect to the mobile wireless communication network.

2. The mobile device of claim 1, where:

the information uniquely identifying the currently unsubscribed mobile device includes:

an integrated circuit card identifier (ICCID) of an identity module of the currently unsubscribed mobile device; or an international mobile equipment identifier (IMEI) of the currently unsubscribed mobile device; and the other information used to activate the currently unsubscribed mobile device with the mobile wireless communication network includes:

user account credentials of a user responsible for the registered account associated with the mobile device under which the currently unsubscribed mobile device will be activated; and a plan selection for which the currently unsubscribed mobile device will be activated.

3. The mobile device of claim 1, where:

the communication interface system includes a Bluetooth transceiver; and the processor, when capturing the information uniquely identifying the currently unsubscribed mobile device, is to:

pair, via the Bluetooth transceiver, the mobile device with the currently unsubscribed mobile device; and receive, via the Bluetooth transceiver and from the currently unsubscribed mobile device, the information uniquely identifying the currently unsubscribed mobile device.

4. The mobile device of claim 1, further comprising an image capture sensor, where the processor, when capturing the information uniquely identifying the currently unsubscribed mobile device, is to:

capture, via the image capture sensor and from a screen of the currently unsubscribed mobile device displaying the information uniquely identifying the currently unsubscribed mobile device, an image depicting the information uniquely identifying the currently unsubscribed mobile device; and process the image depicting the information uniquely identifying the currently unsubscribed mobile device to extract the information uniquely identifying the currently unsubscribed mobile device from the image.

5. The mobile device of claim 1, further comprising:

an image capture sensor; and a quick response (QR) code scanning utility stored in the memory, where the processor, when capturing the information uniquely identifying the currently unsubscribed mobile device, is to:

capture, via the image capture sensor, an image depicting a QR code representing the information uniquely identifying the currently unsubscribed mobile device; and process, via the QR code scanning utility, the image depicting the QR code to extract the information uniquely identifying the currently unsubscribed mobile device.

6. The mobile device of claim 1, where:

the communication interface system includes a near-field communication (NFC) transceiver; and where the processor, when capturing the information uniquely identifying the currently unsubscribed mobile device, is to:

establish, upon the mobile device being brought into proximity of the currently unsubscribed mobile device and via the NFC transceiver, a channel of communication between the mobile device and the currently unsubscribed mobile device; and receive, via the NFC transceiver and from the currently unsubscribed mobile device, the information uniquely identifying the currently unsubscribed mobile device.

7. The mobile device of claim 1, where:

the communication interface system includes a Wi-Fi transceiver; and where the processor, when capturing the information uniquely identifying the currently unsubscribed mobile device, is to:

associate the Wi-Fi transceiver with a Wi-Fi network in common with the currently unsubscribed mobile device;

transmit a request to the currently unsubscribed mobile device via the Wi-Fi transceiver; and as a response to the transmitted request, receive the information uniquely identifying the currently unsubscribed mobile device from the currently unsubscribed mobile device via the Wi-Fi transceiver.

8. The mobile device of claim 7, where the Wi-Fi network is an ad-hoc network established directly between the Wi-Fi transceiver of the mobile device and a Wi-Fi transceiver of the currently unsubscribed mobile device.

9. The mobile device of claim 7, where the request and the response are exchanged via the hypertext transfer protocol.

10. A method, comprising:
  capturing, from a currently unsubscribed mobile device that is currently unsubscribed with respect to a mobile wireless communication network by an active mobile device that is active with respect to the mobile wireless communication network, information uniquely identifying the currently unsubscribed mobile device;
  receiving, via at least one user interface element of the active mobile device, user input identifying other information used to activate the currently unsubscribed mobile device by associating the currently unsubscribed mobile device with a registered account, associated with the active mobile device, for the mobile wireless communication network,
    the other information including information identifying the registered account,
    the registered account, associated with the active mobile device, permitting the active mobile device to access the mobile wireless communication network;
  transferring, to a mobile device activation platform of the mobile wireless communication network via at least one wireless communication transceiver of the active mobile device, the information uniquely identifying the currently unsubscribed mobile device and the other information; and
  providing, to the mobile device activation platform via the at least one wireless communication transceiver of the active mobile device, a user security confirmation received as user input by at least one user interface element of the active mobile device.

11. The method of claim 10, where:
  the information uniquely identifying the currently unsubscribed mobile device includes:
    an integrated circuit card identifier (ICCID) of an identity module of the currently unsubscribed mobile device; or
    an international mobile equipment identifier (IMEI) of the currently unsubscribed mobile device; and
  the other information used to activate the currently unsubscribed mobile device with the mobile wireless communication network includes:
    user account credentials of a user responsible for the registered account associated with the active mobile device under which the currently unsubscribed mobile device will be activated; and
    a plan selection for which the currently unsubscribed mobile device will be activated.

12. The method of claim 11, where capturing the information uniquely identifying the currently unsubscribed mobile device comprises:
  associating, via a Wi-Fi transceiver of the active mobile device, the active mobile device with a Wi-Fi network in common with the currently unsubscribed mobile device;
  transmitting a request to the currently unsubscribed mobile device via the Wi-Fi transceiver of the active mobile device; and
  as a response to the transmitted request, receiving the information uniquely identifying the currently unsubscribed mobile device from the currently unsubscribed mobile device via the Wi-Fi transceiver.

13. The method of claim 12, where the Wi-Fi network is an ad-hoc network established directly between the Wi-Fi transceiver of the active mobile device and a Wi-Fi transceiver of the currently unsubscribed mobile device.

14. The method of claim 12, where the request and the response are exchanged via the hypertext transfer protocol.

15. The method of claim 10, where capturing the information uniquely identifying the currently unsubscribed mobile device comprises:
  pairing, via a Bluetooth transceiver of the active mobile device and a Bluetooth transceiver of the currently unsubscribed mobile device, the active mobile device with the currently unsubscribed mobile device; and
  receiving, via the Bluetooth transceiver of the active mobile device and from the currently unsubscribed mobile device, the information uniquely identifying the currently unsubscribed mobile device.

16. The method of claim 10, where capturing the information uniquely identifying the currently unsubscribed mobile device comprises:
  capturing, via an image capture sensor of the active mobile device and from a screen of the currently unsubscribed mobile device displaying the information uniquely identifying the currently unsubscribed mobile device, an image depicting the information uniquely identifying the currently unsubscribed mobile device; and
  processing the image depicting the information uniquely identifying the currently unsubscribed mobile device to extract the information uniquely identifying the currently unsubscribed mobile device from the image.

17. The method of claim 10, where capturing the information uniquely identifying the currently unsubscribed mobile device comprises:
  capturing, via an image capture sensor of the active mobile device, an image depicting a QR code representing the information uniquely identifying the currently unsubscribed mobile device; and
  processing, via a QR code scanning utility of the active mobile device, the image depicting the QR code to extract the information uniquely identifying the currently unsubscribed mobile device.

18. The method of claim 10, where capturing the information uniquely identifying the currently unsubscribed mobile device comprises:
  establishing, via a near-field communication (NFC) transceiver of the active mobile device and a NFC transceiver of the currently unsubscribed mobile device when the active mobile device and the currently unsubscribed mobile device are brought into proximity, a channel of communication between the active mobile device and the currently unsubscribed mobile device; and
  receiving, via the NFC transceiver of the active mobile device and from the currently unsubscribed mobile device, the information uniquely identifying the currently unsubscribed mobile device.

19. A non-transitory computer readable medium, where execution of programming stored on the non-transitory computer readable medium by a processor implements the method of claim 10.

20. A self-activation portal system, comprising:
  one or more network elements of a mobile wireless communication network serving a plurality of mobile devices, the one or more network elements being configured to:
    detect a currently unsubscribed mobile device attempting to access the mobile wireless communication network,
    redirect the currently unsubscribed mobile device to a self-activation portal server via communication between the currently unsubscribed mobile device and the mobile wireless communication network; and the self-activation portal server that is configured to:
  receive, from the currently unsubscribed mobile device and via the mobile wireless communication network, a request to activate the currently unsubscribed mobile device with an existing account of the mobile wireless communication network, the request including an identifier of a currently active mobile device associated with the existing account;
  determine, based on the identifier included in the request, an owner of the existing account and an identifier of a mobile device associated with the owner of the existing account;
  send, to the identifier of the mobile device associated with the owner of the existing account, a message informing the owner of the existing account about the request to activate and offering the owner of the existing account options as to whether to accept the request to activate;
  upon determining that the identifier included in the request to activate is different from the identifier of the mobile device associated with the owner of the existing account, send a message indicating the owner of the existing account has been informed of the request to activate to the identifier included in the request; and
  upon receiving an indication that the owner of the existing account accepts the request to activate, activate the currently unsubscribed mobile device with the existing account.

* * * * *